Patented Nov. 24, 1925.

1,562,891

UNITED STATES PATENT OFFICE.

HEINRICH KLOPSTOCK AND WALTHER NEUMANN, OF AUSSIG-ON-THE-ELBE, CZECHOSLOVAKIA.

PROCESS FOR THE PRODUCTION OF POTASSIUM CARBONATE.

No Drawing. Application filed July 21, 1924. Serial No. 727,347.

*To all whom it may concern:*

Be it known that we, HEINRICH KLOPSTOCK and WALTHER NEUMANN, citizens of the Republic of Czechoslovakia, residing, respectively, at Dresdnerstrasse No. 47, Aussig-on-the-Elbe, in the Republic of Czechoslovakia, and Dr. Ohnsorgstrasse No. 21, Aussig-on-the-Elbe, in the Republic of Czechoslovakia, have invented certain and new Improvements in and Relating to Processes for the Production of Potassium Carbonate (for which we have filed applications in Czechoslovakia on 28th December, 1922, and 28th August, 1923, and in Germany on 8th December, 1922, and 31st July, 1923), of which the following is a specification.

The production of pure potassium carbonate from technically pure caustic potash has hitherto occasioned great difficulty, and has only been successfully obtained by means of difficult and expensive processes. It is true that, by passing carbonic acid into a caustic potash solution until it is saturated, a complete conversion into potassium carbonate is easily obtained; the resulting potassium carbonate solution, however, contains all the impurities of the raw material from which it is produced. Consequently the separation of pure potassium carbonate from this solution is not possible without further treatment.

Now an object of the present invention is to overcome the aforesaid disadvantages and to provide an improved process whereby potassium carbonate of any desired degree of purity may be obtained in a very simple manner by treating a caustic potash solution with carbonic acid.

According to the invention, a caustic potash solution of suitable strength is treated with carbonic acid for such a length of time that only a certain proportion of the potassium hydroxide is converted into potassium carbonate, which is then separated in any suitable manner. The proportion of hydroxide which is to be converted into carbonate will depend upon the desired degree of purity of the final product, as will be clear from the following description.

Potassium carbonate is difficultly soluble in potassium hydroxide solution and therefore, when carbon dioxide is passed into a concentrated potassium hydroxide solution, potassium carbonate separates out until the concentration of the potassium hydroxide solution has been reduced to a particular value. On passing in a further quantity of carbonic acid after the value has been reached, the solubility of the potassium carbonate in the solution, the potassium hydroxide content of which is always becoming less, increases until, when the reaction is complete, all the potassium carbonate is dissolved. There thus exists a certain point at which the maximum yield of solid potassium carbonate is obtained.

The separated potassium carbonate is pure; all impurities especially potassium chloride, remain in solution, since the liquor is always unsaturated with regard to potassium chloride owing to the conversion of the caustic potash.

In carrying out the process, in order to produce pure and, particularly, chloride free potassium carbonate, carbonic acid is passed into a concentrated caustic potash solution, preferably until the precipitated potassium carbonate just begins to dissolve, the latter being then separated from the mother-liquor and freed from adhering impurities by washing for a short time with water. Preferably, in order to increase the yield, the treatment with carbonic acid is carried out at a reduced temperature.

The mother-liquor is then re-concentrated by evaporation or by the addition of caustic potash and the process repeated. If the liquor should gradually become richer in impurities, the latter are always automatically separated by this concentration process to such an extent that they cannot have any deleterious effect during the precipitation by carbonic acid.

The process may also be adapted to the purification of impure potassium carbonate by treating it with a less concentrated caustic potash solution.

If the purity of the potassium carbonate to be produced need not be such as to satisfy the most exacting requirements, the above-described method of carrying out the process may be considerably simplified.

In this case the incomplete carbonic acid treatment of saturated or less concentrated caustic potash solutions may proceed without regard to the dissolution of the precipitated potassium carbonate but only to such an extent that a proportion of free caustic potash remains in solution, the said proportion being greater or less according as the degree of purity desired in the potassium carbonate is greater or less. This proportion of free caustic potash remaining in solution must be such that, when the potassium carbonate is separated by evaporating and then cooling the liquor, the impurities contained in the original liquor remain more or less in solution.

We claim:—

1. Process for the production of potassium carbonate of a desired degree of purity by treating a caustic potash solution of suitable strength with carbonic acid, according to which the carbonic acid treatment is incomplete so that a proportion of caustic potash, which is greater or less according to the degree of purity desired in the product, remains in solution in the mother-liquor, whereby impurities are to a certain extent retained, and the potassium carbonate is then separated in any suitable manner.

2. Process in accordance with claim 1 for the production of substantially pure potassium carbonate according to which a concentrated, or nearly concentrated, solution of caustic potash is treated with carbonic acid until about the point when the precipitated potassium carbonate begins to dissolve and the precipitated potassium carbonate is then separated.

3. Process in accordance with claim 1 according to which the mother-liquor is again brought to a suitable degree of concentration by evaporation and then treated again with carbonic acid.

4. Process of producing substantially pure potassium carbonate which comprises treating a concentrated or nearly concentrated solution of caustic potash with carbonic acid until about the point when the precipitated potassium carbonate begins to dissolve, separating the precipitated potassium carbonate, concentrating the mother-liquor by evaporation and again treating the same with carbonic acid.

5. Process in accordance with claim 1 according to which the potassium carbonate is separated from the liquor which contains a greater or less proportion of free caustic potash by evaporation and cooling.

6. The process of securing potassium carbonate of a desired degree of purity, which comprises precipitating potassium carbonate from a solution containing caustic potash and impurities, and separating the precipitated potassium carbonate from said solution while the latter still contains caustic potash in quantity sufficient to retain impurities in solution.

7. Process in accordance with claim 1 and wherein the liquor is cooled while it is being treated with the carbonic acid.

8. Process in accordance with claim 4 and wherein the liquor is cooled while it is being treated with the carbonic acid.

HEINRICH KLOPSTOCK.
WALTHER NEUMANN.